United States Patent [19]
Haberle

[11] 3,788,154
[45] Jan. 29, 1974

[54] DEVICE FOR PRODUCING A SWIVELLING MOTION IN A LINEARLY MOVING MEMBER

[76] Inventor: Wilhelm Haberle, Industriegelande/Scheer, Germany

[22] Filed: Aug. 29, 1972

[21] Appl. No.: 284,629

[30] Foreign Application Priority Data
Sept. 13, 1971 Germany.................. P 21 45 700.1

[52] U.S. Cl. .................................................. 74/99
[51] Int. Cl. ........................................... F16h 21/44
[58] Field of Search ........................................ 74/99

[56] References Cited
UNITED STATES PATENTS

| | | |
|---|---|---|
| 1,845,844 | 2/1932 | Korsmo............................... 74/99 |
| 472,747 | 4/1892 | Ball..................................... 74/99 |
| 531,508 | 12/1894 | Clark................................. 74/99 X |
| 2,933,854 | 4/1960 | Crosman............................ 74/99 |
| 2,970,315 | 2/1961 | De Nicolo.......................... 74/99 |
| 3,275,963 | 9/1966 | Hoel................................... 74/99 |

Primary Examiner—Benjamin W. Wyche
Assistant Examiner—Wesley S. Ratliff, Jr.
Attorney, Agent, or Firm—Ernest F. Marmorek

[57] ABSTRACT

The present invention provides a device for producing a swivelling motion in a linearly movable structural member which is also rotatable. The structural member is provided with a guide member which, in turn, is arranged in such a manner that it is displaced with respect to the axis of rotation and bears against a cam.

7 Claims, 3 Drawing Figures

3,788,154

DEVICE FOR PRODUCING A SWIVELLING MOTION IN A LINEARLY MOVING MEMBER

BACKGROUND OF THE INVENTION

1. Field of the Invention

The present invention relates generally to the machine tool arts and more particularly to a device for rotating a linearly moving working tool of a press, of a deep-drawing machine for plastics, or the like.

2. Description of the Prior Art

In order to impart a 180° rotation to a structural member in the course of an axial displacement it is well known that a cam may be incorporated in plates which are arranged adjacent to the structural member whereby the structural member, which is rotatably arranged in a displaceable guide member, engages the plates by means of a projecting member or a cam follower. Moreover, the displacement force is transferred, via this projecting member, to the structural member which is to be rotated. For this purpose, the structural member is retained within an oblong hole in the drive member which, in turn, runs perpendicular to the feed direction. The capital investment required for this type of construction which is used in stamping or punching devices, is high. Also, no precise guidance of the individual parts and no linear displacement of the rotatable structural member is given thereby, so that this type of guidance device cannot be used in the machine-building industry.

Furthermore, when dealing with deep-drawing machines for plastics, in the case of which the bottom working tool has to be rotated through an arc of 90° or 180° in order to eject the formed container, it is known, by means of an extension which is arranged so that it is displaced with respect to the rotary axis, that the pivotable working tool can be guided along a cam which may be open on one side. In order to place the extension against the cam, a pressure actuated piston is used which must continuously exert a force against the extension. However, many operating difficulties arise when this form of forced guidance is used, since the holding power of the piston is frequently not sufficient to counterbalance the high inertia forces of the working tool. This results frequently in the extension being lifted off of the cam and, when the extension returns to the cam the curved track suffers a hard impact and subsequent damages. Furthermore, in order to prevent this from happening, operation at a high working speed is avoided.

SUMMARY OF THE INVENTION

It is therefor the purpose of the present invention to produce a device for creation of a swivelling motion in a linearly moving structural member, through which the disadvantages of the known forms of construction are avoided. The present invention is not only simple as far as its construction is concerned and thereby economical to produce, but above all also guarantees a precise guidance of the rotatable structural member whereby the contact of the cam is not broken. The costs of construction of the present invention are kept low and the device is usable in many ways, especially for the reversing of working tools of presses and deep-drawing machines for plastics.

The present invention, generally speaking, provides a guide member in the form of a lever which, by means of a projecting member such as a guide bolt or rod, is guided through a cam. The projecting member is connected in a torsion-proof manner with the rotatable structural member whereby, for the purpose of a forced guidance during the swivelling motion, the lever is equipped with one or two guideways which are concentrically arranged with respect to the guide rod. The guideways interact with stationary members, that are in the form of bolts, pins or the like.

In the present invention the cam is to be made up of two mirror-image, circular segments, the centerlines of which are tangent with respect to one another, and of a linear guideway which is arranged between the centerlines. The linear guideway is common and opens into both circular segments. The cam, in addition to the aforementioned members, can also be provided with linear guideways which adjoin the circular segments on one or both sides.

The stationary guide pins which cooperate with the guideways of the lever are arranged concentrically with respect to the guide rod and are placed at the center of the arc of the circular segments of the cam.

For the reduction of friction, it is advantageous to provide the guide rod of the lever with a raceway such as an antifriction bearing or roller bearing and/or to apply wear-resistant coatings to the stationary guide pins which engage the guideways of the lever and/or to apply the wear-resistant coatings to the cam and/or to the guideways of the lever.

A device, for providing a swivelling motion to a linearly moving structural member, which is designed in accordance with the present invention, is characterized by low costs of construction, by a simple form of production of the individual component parts, as well as by a great constancy of performance and, above all, by a consistently precis forced guidance of the structural member which is to be rotated. That is to say, if the guide member is made in the form of a lever which, by means of a guide rod, engages the cam and is also provided with guideways which, in turn, cooperate with the stationary guide pins, then a force guidance is provided during the swivelling motion of the rotatable structural member. Namely, as soon as the guide rod no longer rests against other elements on both sides, the guideways which lie concentrically with respect to the guide rod engage the stationary guide pins, so that at that particular state of operation, the guide pins take over the guidance and a separation of the cam and the guide rod is not possible.

The swivel axis of the rotatable structural member is always linearly displaced during the swivelling motion. Thus, since no lateral deflections occur, the drive and the guide means cooperating with the rotatable structural member can likewise be designed in a simple manner. It thus becomes possible to operate with high working speeds. Difficulties are not encountered in the production of the cam, which is made up of two circular segments, nor in the production of the cam, which is made up of two circular segments, nor in the production of the guideways of the lever which run concentrically with respect to the guide rod.

A device designed in accordance with the present invention for producing a swivelling motion in a linearly movable structural member, can be used to special advantage in deep-drawing machines for plastics, namely for the purpose of turning a working tool 180° in order to deliver a formed container to an aggregated pile of containers. However, the device herein proposed can likewise be used advantageously in presses or similar machines, wherein a structural member has to be additionally rotated at an angle of 90°, at one of 180° or at an angle lying between these two, while being displaced in axial direction, and in the case in which a precise guidance has to be guaranteed.

Accordingly it is an object of the present invention to provide a device for producing a swivelling motion in a linearly moving member.

Another object of this invention is to provide a device that can rotate a linearly moving member through an arc of 180° or less.

Further details of the device, designed in accordance with the present invention, for the creation of a swivelling motion of a linearly moving structural member, can be ascertained from the exemplified embodiment which is illustrated in the attached drawings and explained in following detailed manner wherein.

DESCRIPTION OF THE PREFERRED EMBODIMENT

Figure 1:
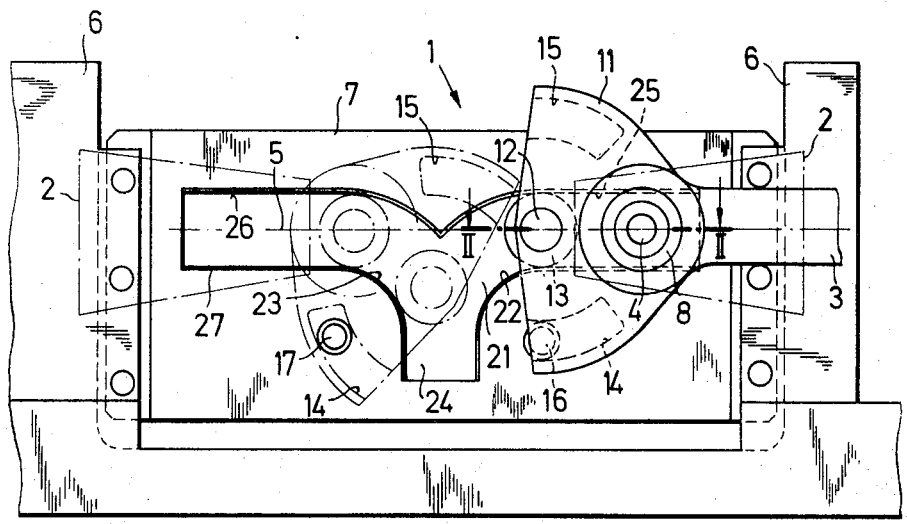
FIG. 1 is an elevational view of the device comprising the present invention.
Figure 2:
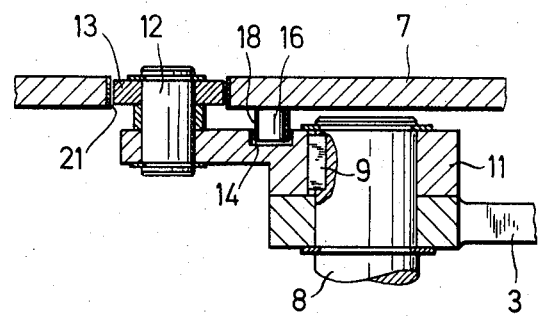
FIG. 2 is a cross-sectional plan view taken approximately along line II—II of FIG. 1 and extending through the structural members engaging one another.

The device comprising this invention is shown in FIGS. 1 and 2 and is generally designated by the reference character 1. The device 1 is designed for the production of a swivelling motion, indicated by a dot and dash line, in a linearly moving structural member 2 and comprises a lever 11 acting as a guide member. The lever 11 is connected in a torsion-proof manner to the structural member 2 by means of shaft-journal 8 and a key 9, and is positioned to the side of the structural member 2. The device 1 furthermore comprises a plate 7 which houses a cam 21 that the lever 11 engages by means of a guide bolt or rod 12. The plate 7 is mounted in the framework 6 of the machine and is arranged to the side of the structural member 2 which, in turn, can be moved in an axial direction by means of a drive member 3. Thus, in the case of an axial displacement, the guide rod 12 is guided by the cam 21 and the structural member 2 is rotated around an axia 4, while the axis 4 is moved thereby in a linear manner along a feeding or spacing axis 5 which is shown by a dot and dash line in FIG. 1 of the drawing. For the reduction of friction, the guide rod 12 is equipped with a raceway 13.

In addition to the guide rod 12 which engages the cam 21, the lever 11 is also provided with two circular guideway grooves 14 and 15, which are concentric with respect to the guide rod 12. Bolts or pins 16 and 17 cooperate with and are arranged to be engaged by the guideways 14 and 15, respectively. When the lever 11 is given a certain swivelling motion, the pins 16 and 17, which are mounted on the plate 7 in a stationary manner, namely at the arc center of circular segments 22 and 23 which form cam 21, engage the guideways 14 and 15. For the reduction of the friction, a wear-resistant coating 18 can be applied to the pins 16 and 17 as is shown in FIG. 2.

The circular segments 22 and 23 of the cam 21 are mirror images with respect to one another, with their center lines running tangent to one another, and open jointly at one end into a common guideway 24. Moreover, the circular segments 22 and 23 are bound externally by linear guideways 25 and 26 by means of which the guidance of the rod 12 is guaranteed over a long axial displacement path. By means of a wear-resistant or low friction coating 27 which is to be applied to both sides of the cam 21 (in FIG. 1, this coating is only partially applied, namely to guideway 26); the friction of the roller 13 can be further reduced when the structural member 2 is moved to a different position.

In the course of the axial displacement of the structural member 2 by means of the drive member 3, the structural member 2 is rotated 180° about the axis 4 through the intervention of the lever 11 which, by means of the guide rod 12, engages the cam 21. Thereby, the guide rod 12 abuts initially against the lateral guide surface formed by the circular segment 22. However, as soon as there is overlapping with the circular segment 23 and there is only one abuttment on one side, the lever 11 is pivoted in such a manner that its guideway 14 engages the pin 16, so that the guide rod 12 is prevented from turning into the circular segment 23. The guide rod 12 is led into the guideway 24 of the cam 21 and the structural member 2 is thereby rotated 90°. Since the lever 11 has an approxiamtely hemicircular shape, the stationary pin 17 also engages the guideway 15 in this particular position. Thus during further axial displacement of the structural member 2, a forced guidance is assured until the roller 13 of the guide rod 12 can again come to lie against both sides of circular segment 23. As soon as the guide rod 12 has reached the linear guideway 26, the structural member 2 is rotated 180°. Axis 4 has thus moved in a straight line along the feeding or spacing axis 5.

Needless to say, it is also possible to select the form of construction of device 1 in such a manner, so that the feeding or spacing axis 5 is tilted upward or downward in a certain region, so that structural member 2, as long as the driving means are appropriately chosen, is not rotated through an angle of 180°, but through any other desired angle. The guide members 16 and 17 thereby cooperate with the guideways 14 and 15 in the same manner as in the above discussed example.

Figure 3:
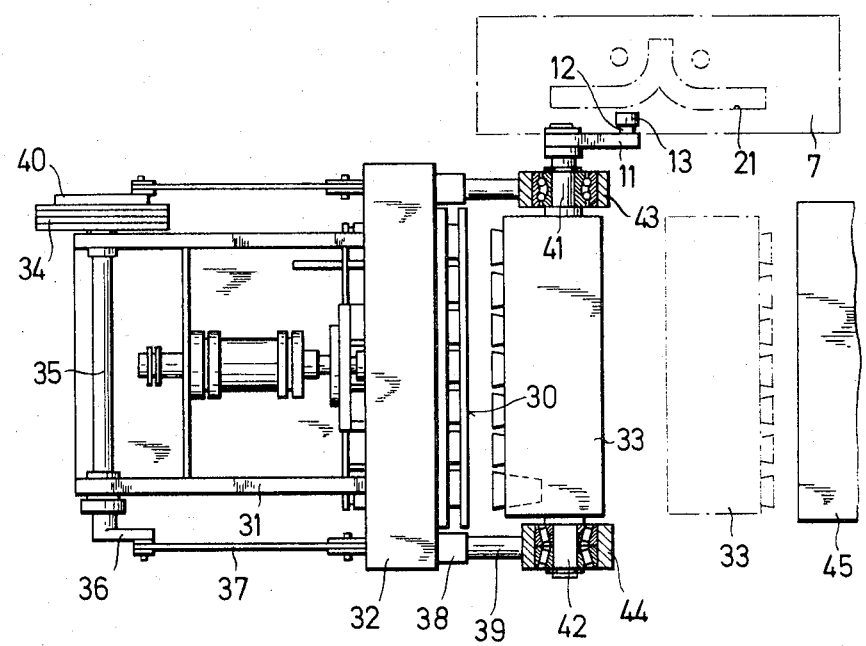
FIG. 3 illustrates a machine designed for the production of containers made from a thermoplastic foil with the machine being equipped with a device designed in accordance with the present invention.

FIG. 3 shows the utilization of the device 1 of FIGS. 1 and 2 in a machine for the production of containers made of a thermoplastically formable foil 30.

This machine comprises a molding unit 32, which is arranged in the machine's framework 31, and of a stamping or punching unit 33. The stamping unit 33 is driven by a motor which is not illustrated and which, through a V-belt pulley 34, is connected in a driving manner with an axle 35. By means of two cranks 36 which are affixed to the extremities of the axle 35 and which, through crank rods 37, are connected with guide rails 39, which in turn, are arranged in spherical journals 38, the driving energy is conveyed from the axle 35 to the stamping or punching unit 33. In order to achieve a controlled intermittent drive of the axle 35 corresponding to the adjusted timing, a switchable coupling 40 is provided on the axle 35 through which a connection between the V-belt pulley 34 and the axle 35 is established.

So that the hollow bodies, which have been produced from the plastic foil 30 by means of the molding unit 32 and the stamping unit 33, can be delievered to a pile aggregate 45 which is shown here in a schematic manner in FIG. 3, the stamping unit 33 is arranged so that it can be rotated 180° and, in addition, is equipped with two shaft journals 41 and 42 which are supported in a rotatable manner in bearings 43 and 44 of the guide rails 39. Moreover, the lever 11 designed in the manner illustrated in FIG. 1, is mounted on the shaft journal 41, with the lever's guide rod 12 engaging the cam 21 which is incorporated in the plate 7. In the case of an axial displacement of the stamping unit 33, the latter is rotated around the journals 41 and 42 by means of the lever 11 which is guided by the cam 21, so that the opening of the stamping unit 33 points in the direction of the pile aggregate 45 and the finished containers can be delievered thereto.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A device for producing a swivelling motion in a linearly moving, structural member, said device comprising:
   a. a lever adapted to be secured to the structural member, said lever including arcuate guideway means therein;
   b. cam follower means secured to said lever for movement together therewith;
   c. a pair of arcuate, stationary cam means for defining the required path of the swivelling motion and arranged to be engaged by said cam follower means the center lines of said cam means being tangential to each other for defining a common end; and
   d. fixed guide means for engaging said guideway means and for guiding said lever whereby when said lever is moved along the path of the swivelling motion, said fixed guide means imparts a rotational force to said lever.

2. The device in accordance with claim 1, wherein said guideway means are concentric with respect to said cam follower means.

3. The device in accordance with claim 1, wherein said cam means comprises two mirror-image circular segment grooves, there being further included a linear groove contiguous with the common end of said mirror-image segments and having a centerline that is contiguous with said tangential centerlines.

4. The device in accordance with claim 3, wherein there is further included at least one additional linear groove that is contiguous with one of said mirror-image segments at the end thereof remote from said tangential centerlines.

5. The device in accordance with claim 3, wherein there are further included two additional linear grooves each of which is contiguous with one of said mirror-image segments at the ends thereof remote from said tangential centerlines.

6. The device in accordance with claim 3, wherein said fixed guide means are positioned at the centers of said circular segments.

7. The device in accordance with claim 1, wherein there is further included antifriction means on at least one of any two members in engagement with each other.

* * * * *